United States Patent
Wietfeldt

(10) Patent No.: US 9,652,020 B2
(45) Date of Patent: May 16, 2017

(54) SYSTEMS AND METHODS FOR PROVIDING POWER SAVINGS AND INTERFERENCE MITIGATION ON PHYSICAL TRANSMISSION MEDIA

(71) Applicant: QUALCOMM Incorporated, San Diego, CA (US)

(72) Inventor: Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 14/308,017

(22) Filed: Jun. 18, 2014

(65) Prior Publication Data

US 2015/0370305 A1    Dec. 24, 2015

(51) Int. Cl.
   *G06F 1/32* (2006.01)
   *H04L 25/02* (2006.01)
   *H04L 25/08* (2006.01)

(52) U.S. Cl.
   CPC .......... *G06F 1/3206* (2013.01); *G06F 1/3234* (2013.01); *H04L 25/026* (2013.01); *H04L 25/08* (2013.01)

(58) Field of Classification Search
   CPC .............................. G06F 1/3206; G06F 1/3234
   See application file for complete search history.

(56) References Cited

U.S. PATENT DOCUMENTS

| | | | |
|---|---|---|---|
| 7,092,453 B2 | 8/2006 | Cavalli et al. | |
| 8,127,164 B2 | 2/2012 | Diab et al. | |
| 8,185,761 B2 | 5/2012 | Diab et al. | |
| 8,201,006 B2 | 6/2012 | Bobrek et al. | |
| 8,321,708 B2 | 11/2012 | Dring et al. | |
| 8,638,838 B1 | 1/2014 | Betts et al. | |
| 2005/0277385 A1* | 12/2005 | Daum | H04B 17/382 455/67.11 |
| 2011/0149764 A1 | 6/2011 | Wietfeldt et al. | |
| 2013/0297833 A1* | 11/2013 | Vadivelu | G06F 13/126 710/5 |
| 2013/0346665 A1* | 12/2013 | Freking | G06F 9/4411 710/313 |
| 2014/0050146 A1 | 2/2014 | Chrisikos et al. | |

(Continued)

OTHER PUBLICATIONS

International Search Report and Written Opinion for PCT/US2015/036202, mailed Aug. 27, 2015, 12 pages.

(Continued)

*Primary Examiner* — Thomas Lee
*Assistant Examiner* — Chad Erdman
(74) *Attorney, Agent, or Firm* — Withrow & Terranova, PLLC

(57) ABSTRACT

Systems and methods for providing power savings and interference mitigation on physical transmission media are disclosed. Exemplary aspects include the ability to change physical layer (PHY) configurations based on operating conditions. By changing the PHY configuration, power consumption and electromagnetic interference (EMI) may be reduced. Still other operating conditions may be used to initiate switching between different PHYs. In another exemplary aspect, parameters of the PHY, such as slew rate, may be modified based on operating conditions to save power and/or reduce interference.

18 Claims, 10 Drawing Sheets

(56) References Cited

U.S. PATENT DOCUMENTS

| | | | |
|---|---|---|---|
| 2014/0092916 A1* | 4/2014 | Diab | H04L 12/40136 370/437 |
| 2014/0126625 A1* | 5/2014 | Lin | H04L 25/03057 375/233 |
| 2014/0167782 A1* | 6/2014 | Yeo | G01R 31/002 324/613 |
| 2014/0192723 A1* | 7/2014 | Schenk | H04W 84/18 370/328 |
| 2014/0273852 A1* | 9/2014 | McCormack | H04B 5/0031 455/41.2 |
| 2015/0003506 A1* | 1/2015 | Kesling | H04B 3/46 375/224 |
| 2015/0220140 A1* | 8/2015 | Por | G06F 1/266 710/314 |
| 2015/0319757 A1* | 11/2015 | Baldemair | H04L 5/0048 370/329 |

OTHER PUBLICATIONS

International Preliminary Report on Patentability for PCT/US2015/036202, mailed Sep. 1, 2016, 19 pages.
Second Written Opinion for PCT/US2015/036202, mailed May 13, 2016, 5 pages.

\* cited by examiner

SYSTEMS AND METHODS FOR PROVIDING POWER SAVINGS AND INTERFERENCE MITIGATION ON PHYSICAL TRANSMISSION MEDIA

BACKGROUND

I. Field of the Disclosure

The technology of the disclosure relates generally to physical transmission media, and particularly to a physical layer (PHY) within a protocol stack.

II. Background

Computing devices are prevalent in contemporary society. Such computing devices benefit from an increasing array of functionality being made available by virtue of increasingly complex integrated circuits. Such integrated circuits may be positioned on a printed circuit board and interconnected through non-transitory conductive elements, for example, physical traces. Signals are routed onto these physical traces according to variations of the Open System Interconnection (OSI) model. The OSI model defines various abstraction layers, which encapsulate a digital payload. The lowest level of the model is the physical layer or PHY, which is responsible for converting the digital bit stream into an analog or pseudo-analog signal capable of being transmitted on the physical trace. While such communication may take place between integrated circuits on the printed circuit board, smaller scale physical traces may exist within the integrated circuit and may also have OSI stacks with their own PHY associated with signals routed across these interior traces.

Different PHY may have different "rules" associated therewith. For example, one PHY may have predefined voltage levels larger or smaller than a second PHY. Circuit designers may choose a particular PHY based on assumptions about how the circuit will operate within a computing device. For example, if a relatively short distance is traversed by a physical trace, a lower power PHY may be selected as compared to situations in which a longer trace must be traversed.

However, it is not uncommon for a single integrated circuit to be used in multiple different environments. For example, such an integrated circuit may be used in a smart phone as well as a tablet. While the integrated circuit may use a PHY optimized for one environment based on the assumptions of the designer, the PHY may not be optimized for the second environment. Likewise, even within a single environment, there may be environmental or operational circumstances which change the operating conditions of the traces and make a particular PHY more or less attractive. For example, if a transceiver with a high speed frequency synthesizer is selectively activated and put to sleep, the frequency synthesizer may create electromagnetic interference (EMI) in the environment of the traces via conductive or radiated means, but only when the frequency synthesizer is active. Likewise, the signals on the traces may act as EMI aggressors for other elements within the computing device. Accordingly, there is a need to be able to improve the flexibility of the PHY after installation within a computing device.

SUMMARY OF THE DISCLOSURE

Aspects disclosed in the detailed description include systems and methods for providing power savings and interference mitigation on physical transmission media. Exemplary, non-limiting aspects include the ability to change physical layer (PHY) configurations based on operating conditions. By changing the PHY configuration, power consumption and electromagnetic interference (EMI) may be reduced. For example, if there is no EMI risk, a PHY with a lower voltage swing signal may be sent across a physical conductor. Conversely, if there is substantial EMI risk, a PHY with high voltage swing signals may be used. However, even though a higher voltage signal PHY may be used, there may be a net power savings because signals may avoid being resent according to error correction protocols. Still other operating conditions may be used to initiate switching between different PHYs. For example, the PHY may be changed so that the physical conductor does not function as an EMI aggressor within the computing device. In another exemplary aspect, parameters of the PHY, such as slew rate, may be modified based on operating conditions to save power and/or reduce interference. It should be appreciated as used herein, changing a PHY configuration includes changing between different PHY, as well as, changing a parameter of the PHY.

In this regard in one aspect, a computing device is disclosed. The computing device comprises a system on a chip (SOC). The SOC comprises an interface comprising one or more pins coupled to a physical conductor. The SOC also comprises a configuration controller associated with the interface. The computing device also comprises a coexistence manager communicatively coupled to the configuration controller. The coexistence manager detects operating conditions on the physical conductor and instructs the configuration controller to change PHY configurations for the interface based on changes in the operating conditions.

In another aspect, a SOC is disclosed. The SOC comprises an interface comprising one or more pins coupled to a physical conductor. The SOC also comprises a configuration controller associated with the interface configured to change PHY configurations for the interface based on changes in operating conditions.

In another aspect, a method of controlling data transmission in a computing device is disclosed. The method comprises detecting initial operating conditions within a computing device with a coexistence manager. The method also comprises instructing a configuration controller in a SOC to operate according to a first PHY configuration. The method also comprises detecting subsequent operating conditions within the computing device. The method also comprises instructing the configuration controller to change the first PHY configuration to a second PHY configuration based on the subsequent operating conditions.

In another aspect, a method of controlling data transmission in a computing device is disclosed. The method comprises receiving, at a configuration controller within a SOC, an instruction to operate according to a PHY configuration. The method also comprises receiving, at the configuration controller, a subsequent instruction to change the PHY configuration based on subsequent operating conditions.

DETAILED DESCRIPTION

Figure 1:
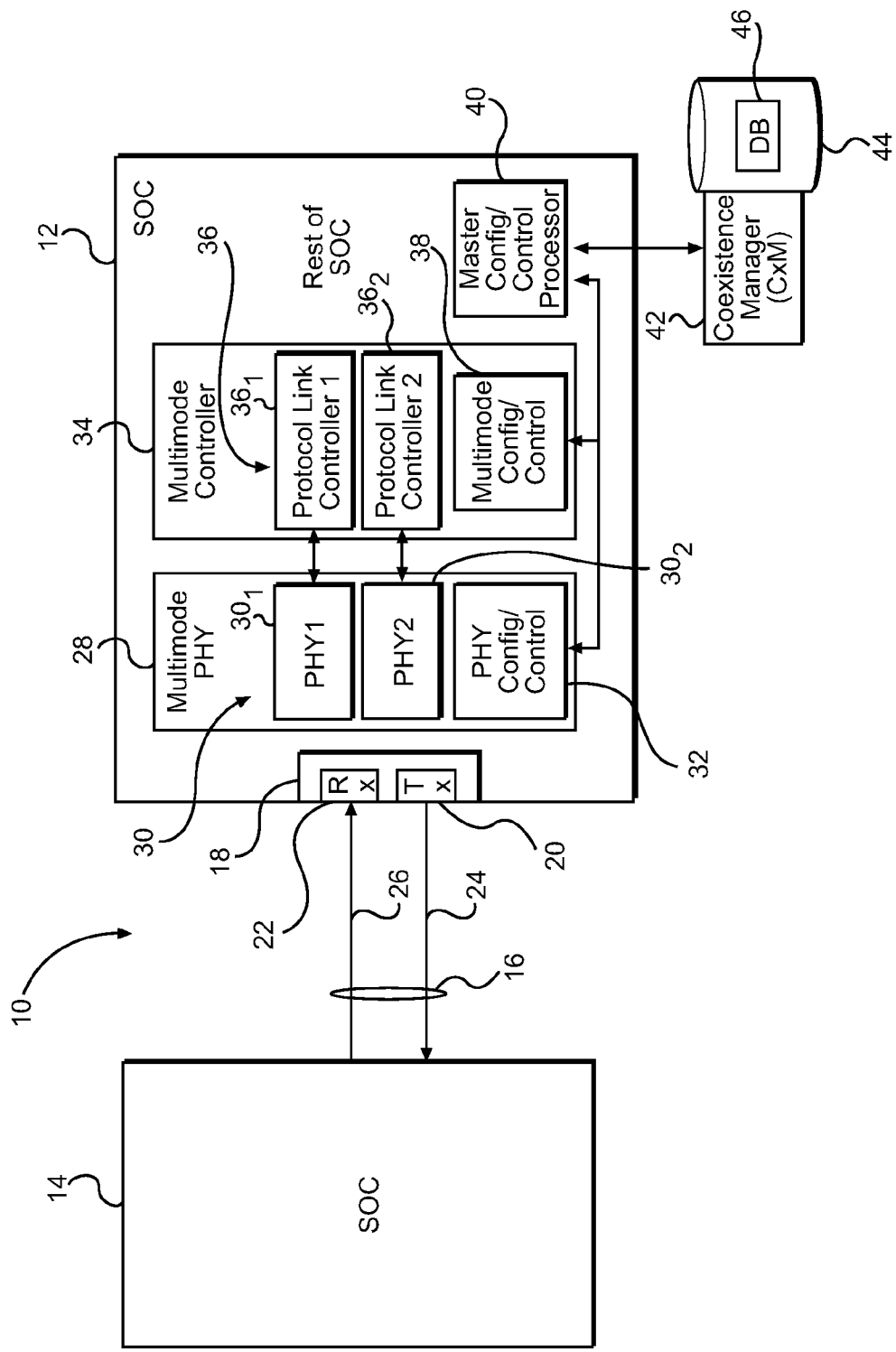
FIG. 1 is a block diagram of interchip communication according to an exemplary aspect of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for providing power savings and interference mitigation on physical transmission media. Exemplary, non-limiting aspects include the ability to change physical layer (PHY) configurations based on operating conditions. By changing the PHY configuration, power consumption and electromagnetic interference (EMI) may be reduced. For example, if there is no EMI risk, a PHY with a lower voltage swing signal may be sent across a physical conductor. Conversely, if there is substantial EMI risk, a PHY with high voltage swing signals may be used. However, even though a higher voltage signal PHY may be used, there may be a net power savings because signals may avoid being resent according to error correction protocols. Still, other operating conditions may be used to initiate switching between different PHYs. For example, the PHY may be changed so that the physical conductor does not function as an EMI aggressor within the computing device. In another exemplary aspect, parameters of the PHY, such as slew rate, may be modified based on operating conditions to save power and/or reduce interference. It should be appreciated as used herein, changing a PHY configuration includes changing between different PHY, as well as, changing a parameter of the PHY.

Exemplary aspects of the present disclosure are well suited for application with chip to chip (i.e., interchip) communication over a physical conductor that may be positioned on a printed circuit board. This exemplary aspect is discussed below with reference to FIGS. 1 and 2. However, the present disclosure is not so limited, and exemplary aspects are also applicable to intrachip communication (e.g., internal data buses) within an integrated circuit (sometimes referred to as a "chip" herein) or package containing integrated circuits. This exemplary aspect is discussed below with reference to FIGS. 3A and 3B. In particular, aspects of the present disclosure evaluate operating conditions associated with physical conductors that convey signals between a transmitter and receiver (whether it be interchip or intrachip) and provide instructions to change PHY configuration so as to compensate for operating conditions. In a first aspect, changing the configuration comprises changing PHYs and in a second aspect, changing the configuration comprises changing a parameter associated with a PHY. Evaluation of the operating conditions may include evaluation of static conditions such as the type of computing device into which the transmitter has been positioned and the length of the physical conductor over which signals must be transmitted, as well as dynamic conditions such as whether there are EMI concerns, whether power can be conserved, or the like. Various ones of these processes are discussed with reference to FIGS. 4-6.

A further note about nomenclature is appropriate. While a PHY may have a protocol such as 8b10b or other encoding, exemplary aspects of the present disclosure are PHY protocol agnostic, and the term "protocol" may be understood as being used for an application protocol, such as for the peripheral component interconnect (PCI) express (PCIe) protocol or universal serial bus (USB) protocol, which relates to applications and their management in the context of an operating system, application programming interfaces, software driver, and the like. Therefore, the present disclosure distinguishes between a PHY protocol and application protocol by referring to the first as PHY and the second as protocol.

In this regard, FIG. 1 is a simplified block diagram of a computing device 10 with a first system on a chip (SOC) 12 and a second SOC 14, each of which is coupled to transmission media 16. The transmission media 16 are a plurality of physical conductors such as traces on a printed circuit board, copper line, or the like. While not illustrated specifically, each SOC 12, 14 is an integrated circuit that may be soldered to a printed circuit board or inserted into a socket on the printed circuit board. Inputs and outputs of such integrated circuits are provided through pins or balls as is well understood. The pins or balls are electrically or capacitively coupled to "channels" or "lanes" within the transmission media 16 as is well understood. Each physical trace within the transmission media 16 may be electrically coupled to a different pin or ball on the integrated circuit of the SOC 12. The SOC 12 has an interface 18 with a transmitter (TX) 20 and a receiver (RX) 22 associated therewith. The transmitter 20 is electrically coupled to and drives pins coupled to conductors within a transmission path 24; the receiver 22 is electrically coupled to and receives signals from pins coupled to conductors within a receiving path 26. It should be appreciated that the transmission path 24 may include a data channel, a clock, a power line, a ground, sideband signals, and other data channels as is well understood. Similarly, the receiving path 26 may contain similar channels. In an exemplary aspect, transmission and reception may be combined onto a single set of conductors such as through a time division multiplexing (TDM) or half-duplex arrangement where transmission direction may be reversed. Likewise, it should be appreciated that data channels may be differential data conductors or single ended data conductors, or even multi-wire conductors, such as three-phase transmission as is well understood.

With continued reference to FIG. 1, the interface 18 is coupled to a multimode PHY module 28 that includes a plurality of PHY drivers 30 (only two shown $30_1$ and $30_2$). It should be appreciated that, as used herein, the term "driver" is meant to include their reciprocating receivers, given that an interface may consist generally of bidirectional communication. While only two PHY drivers 30 are shown, the present disclosure is not so limited and is scalable to any number of PHY drivers 30. In an exemplary aspect, a multiplexer (MUX) (not shown) controls which PHY driver 30 is actively driving the interface 18. The multimode PHY module 28 may further include an optional PHY configuration and control module 32 (labeled "PHY config/control" in FIG. 1). The PHY configuration and control module 32 may be used to control the MUX (if present) as well as to modify various operational parameters of a given PHY driver 30 as will be explained in greater detail below.

With continued reference to FIG. 1, the multimode PHY module 28 is coupled to a multimode controller module 34. The multimode controller module 34 may include a plurality of protocol link controllers 36, one for each of the respective PHY drivers 30. Thus, as illustrated, the multimode controller module 34 includes link controllers $36_1$ and $36_2$. The multimode controller module 34 may further include an optional multimode configuration and control module 38 (sometimes referred to herein as a configuration controller). The multimode configuration and control module 38 may indicate which link controller 36 is active, or may otherwise control the link controllers 36.

With continued reference to FIG. 1, the SOC 12 may also include a master configuration and control processor 40 (sometimes referred to herein as a configuration controller). The master configuration and control processor 40 may perform the functions of the PHY configuration and control module 32 and/or the multimode configuration and control module 38 if either is not present. Alternatively, the master configuration and control processor 40 may instruct the PHY configuration and control module 32 and/or the multimode configuration and control module 38 to control respective elements as further explained in greater detail below. The master configuration and control processor 40 is communicatively coupled to a coexistence manager (CxM) 42. An exemplary function of the CxM 42 is to optimize the performance and other aspects of wired and wireless transmissions within the device in a harmonious fashion to enable maximum coexistence of entity operations as further explained in greater detail below. The CxM 42 may have a memory element 44 associated therewith that has a database (DB) 46 stored therein.

With continued reference to FIG. 1, the CxM 42 receives information about the operating conditions of the computing device 10 and/or particular information about the transmission media 16, and compares this information to information within the DB 46. Based on whether the operating conditions match or exceed predefined thresholds or criteria, the CxM 42 instructs the master configuration and control processor 40 to switch between PHY drivers 30 to change the PHY configuration or modify operation of a particular PHY driver 30 to change the PHY configuration as explained in greater detail below.

With continued reference to FIG. 1, the receiver 22 receives signals and processes them according to the active PHY before passing them to the corresponding link controller 36 for use within the SOC 12. It should be appreciated that the SOC 14 may be substantially similar to the SOC 12 and can send and receive signals across the transmission media 16 according to exemplary aspects of the present disclosure.

In an exemplary aspect, the CxM 42 may determine that one PHY is better suited for current operating conditions and instruct the master configuration and control processor 40 to use the indicated PHY by operation of the appropriate PHY driver 30. The operating conditions may be static conditions, such as an installation factor. For example regarding the installation factor, certain PHY may be appropriate for use in tablet devices and a different PHY may be appropriate for use in a smaller device such as a smart phone.

In an exemplary aspect, such changes may be between different related PHY for a given protocol. Thus, in an exemplary aspect, a first PHY might be the PHY for the PCIe protocol, referred to as the PCIe PHY, and a second PHY might be the PHY for the mobile-PCIe (M-PCIe) protocol (i.e., PCIe PHY and M-PCIe PHY represent different related PHY for the PCIe protocol, i.e., that are capable of transporting the PCIe protocol). The higher voltage swings of the PCIe PHY may be appropriate for use with the longer transmission media 16 within a tablet, and the lower voltage swings of the M-PCIe PHY may be appropriate for use with the shorter transmission media 16 of a smart phone.

In another exemplary aspect, such changes in the PHY configuration may be changing between different unrelated PHY. For example, a first PHY might be a PCIe PHY and a second PHY might be a USB PHY. Again, particular attributes of the PHY may make one PHY better suited for use with longer transmission media 16 within a tablet or shorter transmission media 16 for a smart phone.

While static conditions, such as an installation factor, may be evaluated during manufacture or at startup of the computing device 10, other operating conditions may be dynamic and may thus be evaluated dynamically. For example, activation of a proximate USB data transmission may generate substantial electromagnetic interference (EMI) from the transmission media 16 as an aggressor and a more robust PHY in a neighboring transmission media may be selected to compensate for the aggressor. In another exemplary aspect, activation of a wireless transmitter (e.g., a cellular modem) within the computing device 10 may as an aggressor generate substantial EMI on the transmission media 16, and a more robust PHY may be selected to compensate for the aggressor. In another exemplary aspect, external aggressors such as a nearby cable with a television signal thereon, a printer printing, or such a device may create EMI on the transmission media 16, and a more robust PHY may be selected to compensate for the aggressors. Accordingly, such dynamic conditions, such as an EMI value of any aggressor (which may be represented by an increase in noise characteristics of the receiver PHY) may be evaluated and an appropriate PHY configuration selected, where the PHY configuration is, in this case, switching between different PHY (e.g., PCIe to USB). Note that the aggressors are not mutually exclusive and multiple aggressors may combine such that a different PHY is required based on a composite EMI value. In still another exemplary aspect, a high voltage PHY may create electromagnetic compatibility (EMC) issues for other elements within the computing device 10. Some values from such EMC issues may be evaluated and an appropriate PHY selected. For example, operation on a high voltage PCIe PHY may create an impact in the wireless transmitter of the cellular modem that can be eliminated by using the lower voltage swing of the M-PCIe PHY.

As alluded to above, the DB 46 stores various threshold and predefined criteria, which when met, cause the CxM 42 to instruct the master configuration and control processor 40 to change PHY configurations. While completely changing PHY is one solution, the present disclosure is not so limited. In exemplary aspects, parameters within the PHY may be adjusted to compensate for operating conditions. For example, a voltage amplitude, also known as the launch amplitude, a transmission voltage slew rate, or simply slew rate, and/or data encoding such as 8b10b encoding may be varied within a PHY to optimize operation of the transmissions on the transmission media 16. Optimization may be completed to minimize one or more of: power consumption, error rates of transmission, EMI/EMC impacts, or other criterion as needed or desired.

Figure 2:
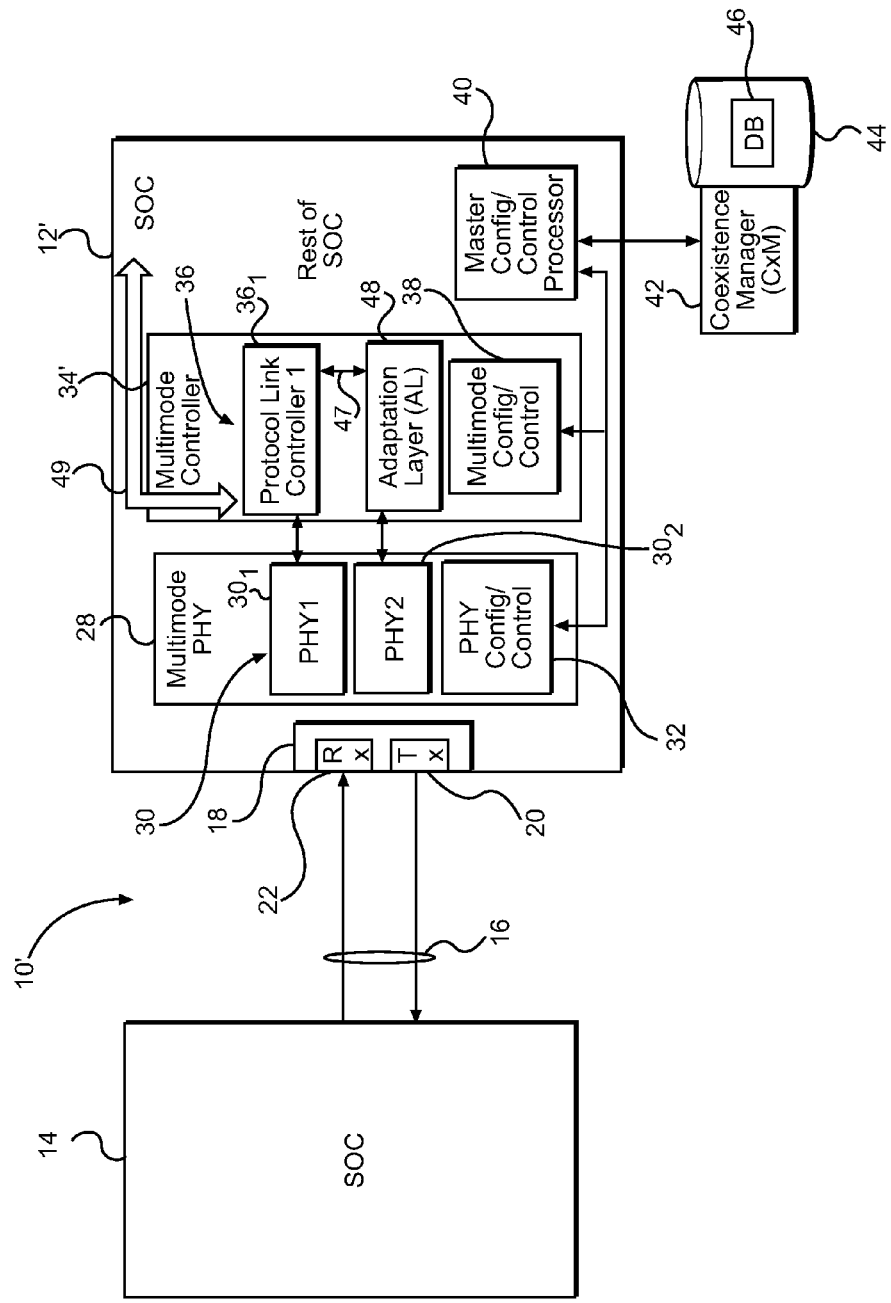
FIG. 2 is a block diagram of interchip communication with an adaptation layer according to an exemplary aspect of the present disclosure.

FIG. 2 illustrates a computing device 10' which is substantially similar to the computing device 10 of FIG. 1. However, the computing device 10' may include a SOC 12' having a multimode controller module 34' that does not have a full complement of link controllers 36. In particular, the multimode controller module 34' includes an adaptation layer 48 that converts commands for PHY driver $30_2$ to commands for the link controller $36_1$. That is, the adaptation layer 48 removes aspects of the PHY associated with PHY driver $30_2$ to expose the underlying link layer. For example, PHY driver $30_1$ may operate with the PCIe PHY, and the second PHY driver $30_2$ may operate with the M-PCIe PHY. Both the PCIe PHY and the M-PCIe PHY carry the PCIe protocol within the stack. The adaptation layer 48 removes aspects of the M-PCIe PHY to expose the PCIe protocol within the stack. Another example where use of the adaptation layer 48 may be appropriate is in a USB 3.0 and Super Speed (USB3) Inter-Chip (SSIC) protocol conversion, whereby the adaptation layer 48 translates the SSIC protocol based on MIPI M-PHY to the USB3 protocol. Another example where use of the adaptation layer 48 may be appropriate is in a MIPI® (Mobile Industry Processor Interface) C-PHY to D-PHY conversion. Still other protocols may use an adaptation layer 48 if desired without departing from the scope of the present disclosure.

With continued reference to FIG. 2, it should be appreciated that not only does the adaptation layer 48 pass adapted signals to the protocol link controller $36_1$, but also the protocol link controller $36_1$ may pass signals to the adaptation layer 48 where aspects of the second PHY are added to encapsulate the PCIe protocol within the stack, within the PHY of the second PHY. This two-way communication is denoted generally by arrow 47. Regardless of whether the signal came from the adaptation layer 48 or the first PHY driver $30_1$, the protocol link controller $36_1$ may pass the signals to the rest of the SoC 12' as generally indicated by arrow 49.

Figure 3A:
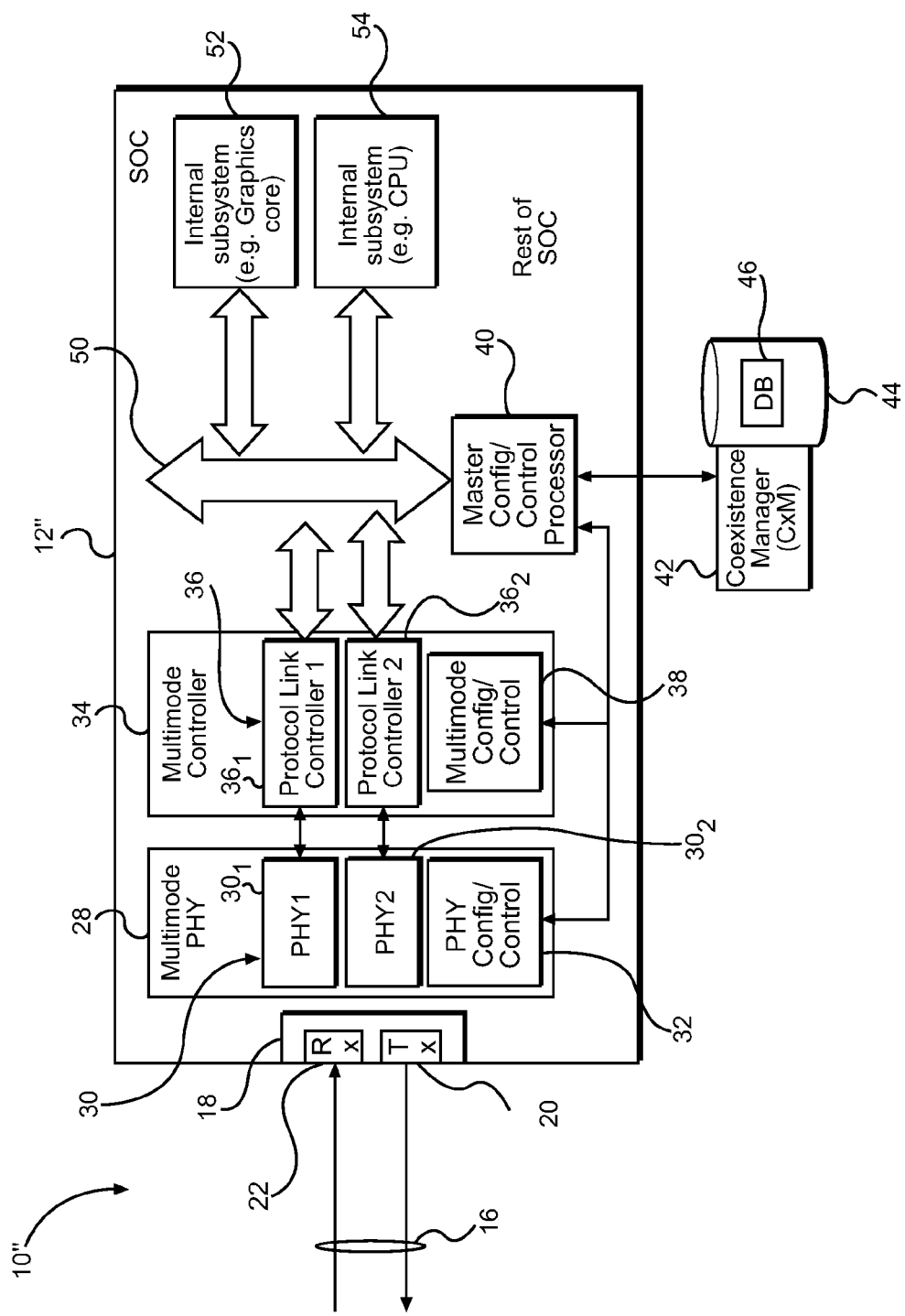
FIG. 3A is a block diagram of intrachip communication comparable to FIG. 1 according to an exemplary aspect of the present disclosure.

FIG. 3A illustrates another exemplary aspect of the present disclosure. In particular, a computing device 10" with SoC 12", which may be substantially similar to the computing devices 10, 10' of FIGS. 1 and 2 with respect to interchip communications, but further extends the PHY optimization concepts of the present disclosure to intrachip communications. "Intrachip," as used herein, is meant to include on-die communications and inter-die communications within a given integrated circuit package. In this regard, the computing device 10" includes an internal bus 50 that carries communications between internal subsystems 52, 54. In an exemplary aspect, the internal subsystem 52 is a graphics core and the internal subsystem 54 is a central processing unit (CPU). The internal bus 50 carries high-speed on-chip communications such as through an advanced high-performance bus (AHB) protocol or open core protocol (OCP). The master configuration and control processor 40 may change the protocol used on the internal bus 50 in response to instructions from the CxM 42 based on operating conditions on the internal bus 50. Changing the protocol used on the internal bus 50 effectively changes the internal PHY used on the internal bus 50.

Figure 3B:
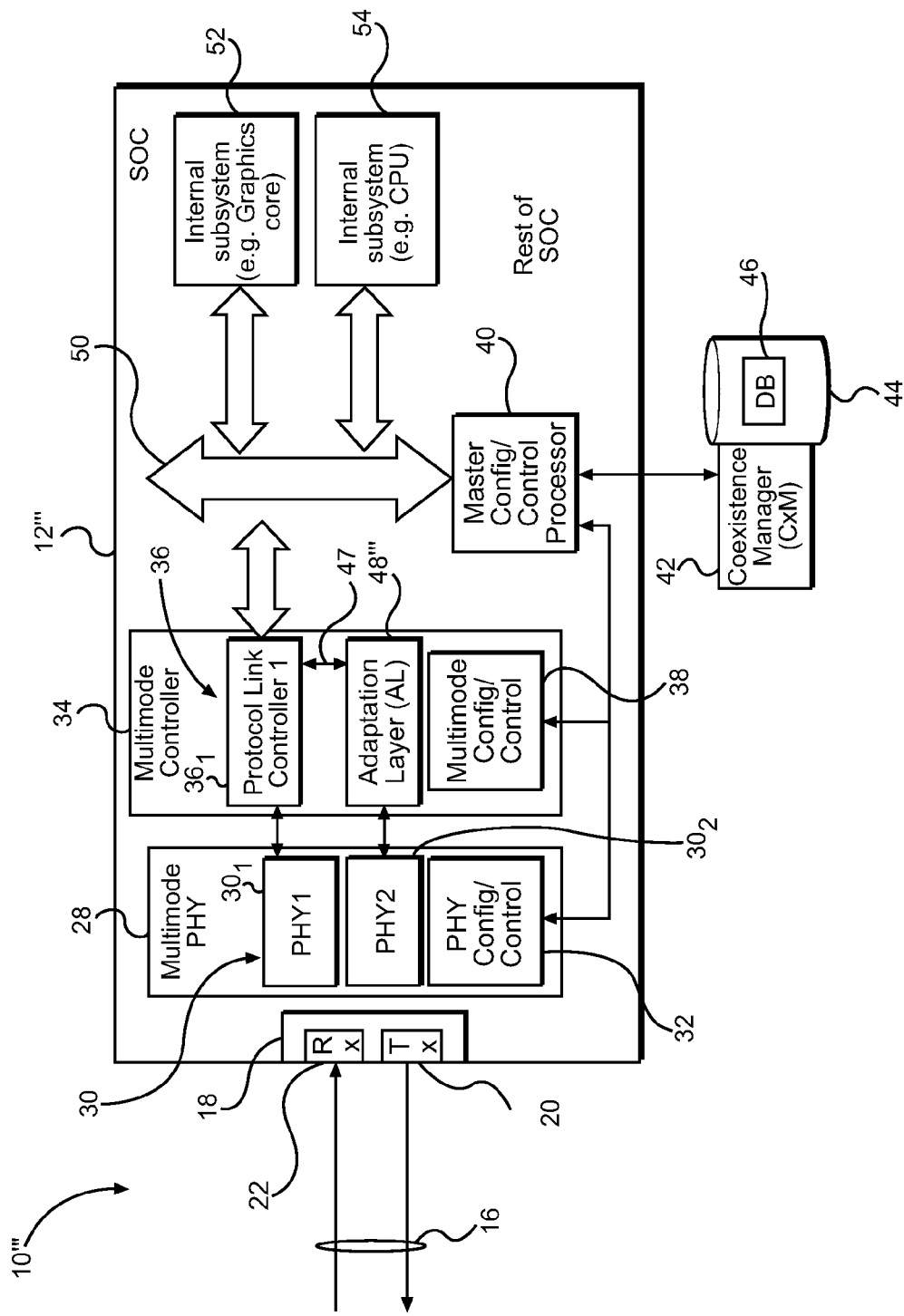
FIG. 3B is a block diagram of intrachip communication comparable to FIG. 2 and having an adaptation layer according to an exemplary aspect of the present disclosure.

Similar to the computing device 10" of FIG. 3A, the computing device 10''' with SoC 12''' of FIG. 3B controls the PHY configuration on the internal bus 50, but may further include an adaptation layer 48''' that operates to remove aspects of a PHY to reveal an underlying protocol. In this regard, the adaptation layer 48''' is similar to the adaptation layer 48, but works for the internal bus 50 instead of, or in addition to, the transmission media 16.

In short, aspects of the present disclosure allow the CxM 42 to evaluate operating conditions (either static or dynamic) during manufacturing (installation), at start up, or during normal operations of the computing devices 10, 10', 10", or 10''', and ascertain if a change in the PHY configuration is appropriate by comparing the operating conditions to data stored in the DB 46 in the memory element 44. By providing the SOCs 12, 12', 12", 12''' of FIGS. 1-3B with multiple PHY, the SOCs 12, 12', 12", 12''' may be used in both smart phones and tablets (i.e., different system configurations) and pick an appropriate PHY based on the device into which the SOCs 12, 12', 12", 12''' are placed. Likewise, the CxM 42 may compensate for EMI/EMC issues. Allowing such flexibility allows pins on the SOC 12, 12', 12", 12''' the opportunity to be shared/reused, which results in cost savings, savings in silicon area, savings in board area, and general cost savings as the SOC 12, 12', 12", 12''' does not require two separate interfaces 18 with their dedicated PHY for essentially the same interface function. Even when the pins are not reused, the EMI/EMC benefits of being able to change PHY configurations have value. Still further, the selection of the PHY may be done to select the lowest power interface that still meets other design criteria (e.g., bit error rate below a predefined threshold). Still further, it should be appreciated that these changes may be done on a per-lane basis within the transmission media 16. For example, PCIe has multiple data lanes defined in its standard. Different data lanes may use different PHY according to the operational needs of the computing devices 10, 10', 10", 10'''.

The DB 46 may be updated or patched to reflect software and operating changes within the computing devices 10, 10', 10", 10'''. For example, while the computing device 10 is in a debug mode, one set of threshold criteria may be used and then replaced with more lenient (or more stringent) criteria and thresholds for normal operation. Note that regardless of when the change in PHY configuration occurs, there may be a signaling protocol that alerts the receiving second SOC 14 of FIGS. 1 and 2 that the PHY is about to change. This change signal may be a proprietary signal or standardized as needed or desired.

Figure 4:
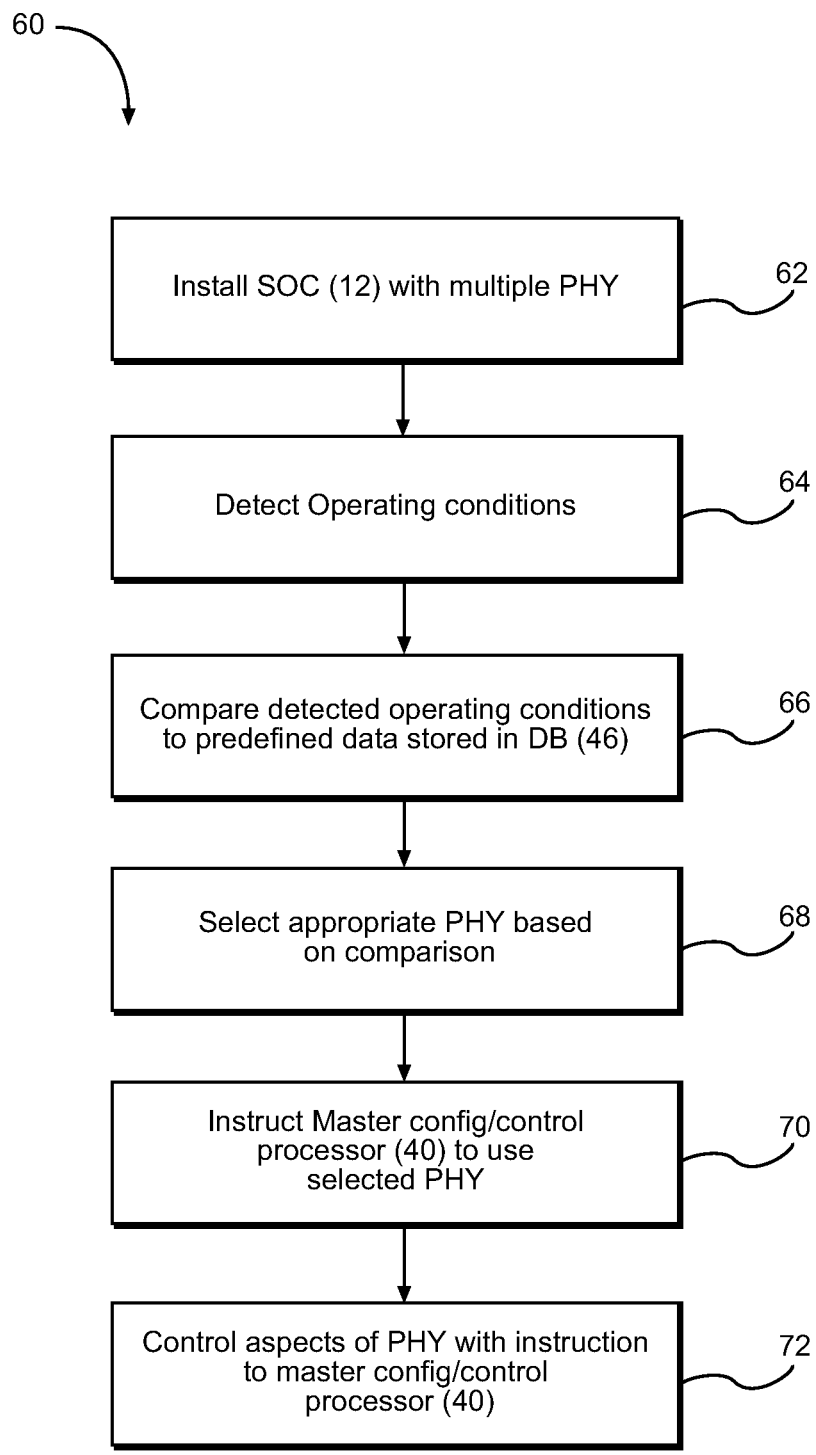
FIG. 4 is a flow chart of a generic exemplary process associated with changing a physical layer (PHY) according to the present disclosure.

The generic process for the present disclosure is provided with reference to FIG. 4, followed by specific examples in FIGS. 5-8. In this regard, FIG. 4 illustrates a process 60 that begins with the installation of a SOC 12 with multiple PHY (block 62). The multiple PHY may be interchip PHY or intrachip PHY (or both). The process 60 continues with the CxM 42 detecting the operating conditions (block 64). The operating conditions may include system configuration, be a function of time, be a function of application, detection of possible or probable EMI/EMC, or the like. The CxM 42 compares the detected operating conditions to the predefined data stored in the DB 46 (block 66). The CxM 42 may then select an appropriate PHY based on the comparison (block 68). The CxM 42 may then instruct the master configuration and control processor 40 to use the selected PHY (block 70). This instruction may mean that the PHY changes or may mean that an initially selected PHY is used. Once a PHY is selected, the operating conditions may be evaluated again and aspects or parameters of the PHY may be controlled with appropriate instruction from the CxM 42 to the master configuration and control processor 40 (block 72). Control of aspects or parameters of the PHY may include voltage levels, a transmission slew rate, encoding, or other attribute of the PHY. Note that block 72 may be combined with block 68 if appropriate and may or may not involve an additional detection of the operating conditions.

Figure 5:
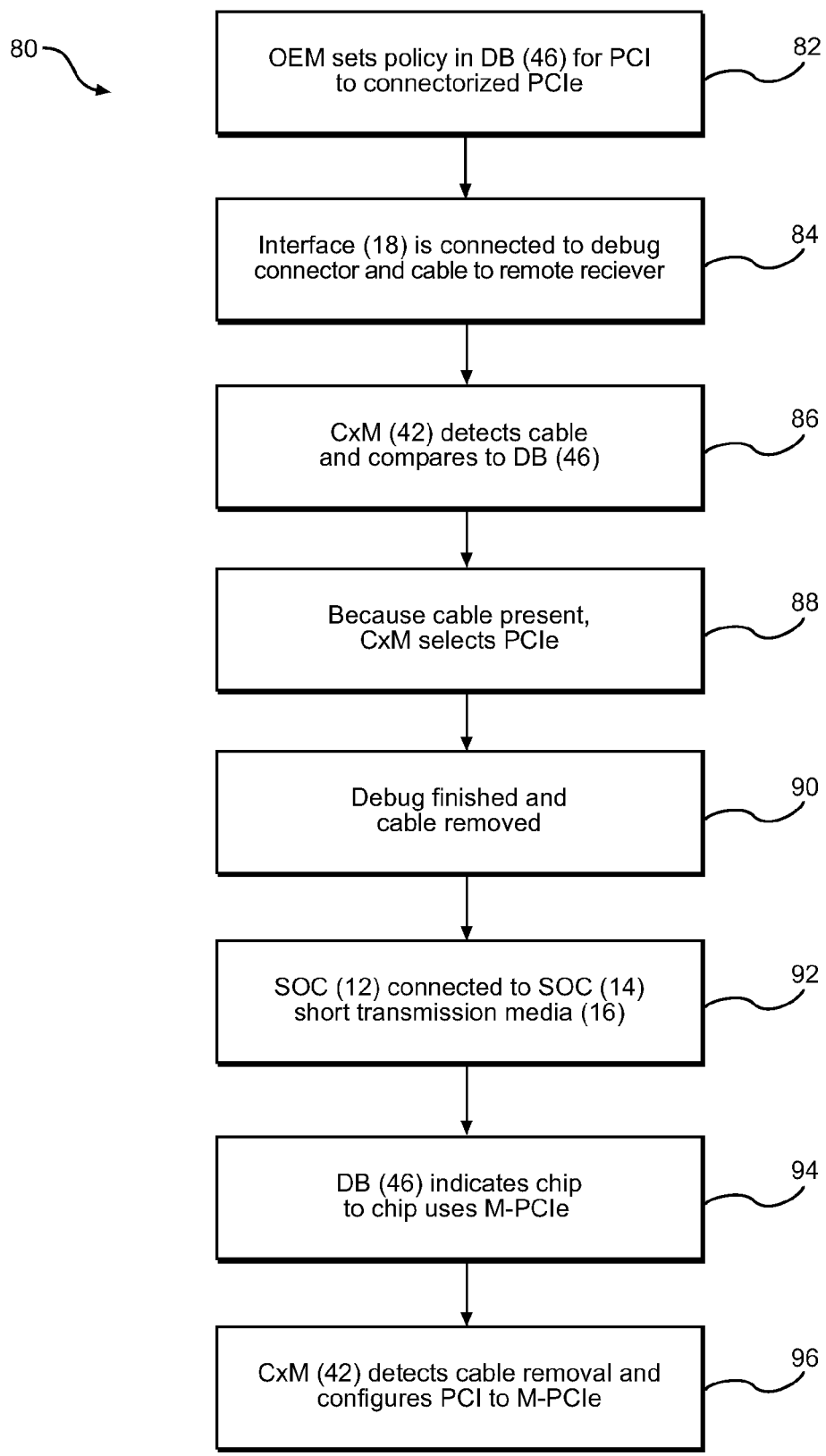
FIG. 5 is a flow chart of a first exemplary process of changing a PHY at manufacturing.

While FIG. 4 describes the generic process 60, FIGS. 5-8 describe specific situations to assist the reader in understanding nuances associated with exemplary aspects of the present disclosure. In particular, FIG. 5 illustrates a process 80. The process 80 begins with the original equipment manufacturer (OEM) setting the policy in the DB 46 for PHY to indicate "connectorized PCIe" (block 82). This setting indicates that if the interface 18 is set to PCI and a cable or connector is detected, then PCIe PHY should be used.

With continued reference to FIG. 5, the process 80 continues with the interface 18 being connected to a debug connector and cable used to connect to a remote receiver (block 84). The CxM 42 detects the presence of the cable and compares this operating condition to the DB 46 (block 86). Based on the OEM setting in the DB 46 (i.e., the presence of the cable), the CxM 42 selects PCIe PHY (block 88).

With continued reference to FIG. 5, the debugging is finished and the cable is then removed (block 90). The SOC 12 is then coupled to the SOC 14 through relatively short transmission media 16 (block 92). The OEM may further program the DB 46 to indicate chip to chip PCI uses M-PCIe PHY (block 94). The CxM 42 detects the new operating condition of the cable removal and configures the PHY to use M-PCIe PHY (block 96).

Figure 6:
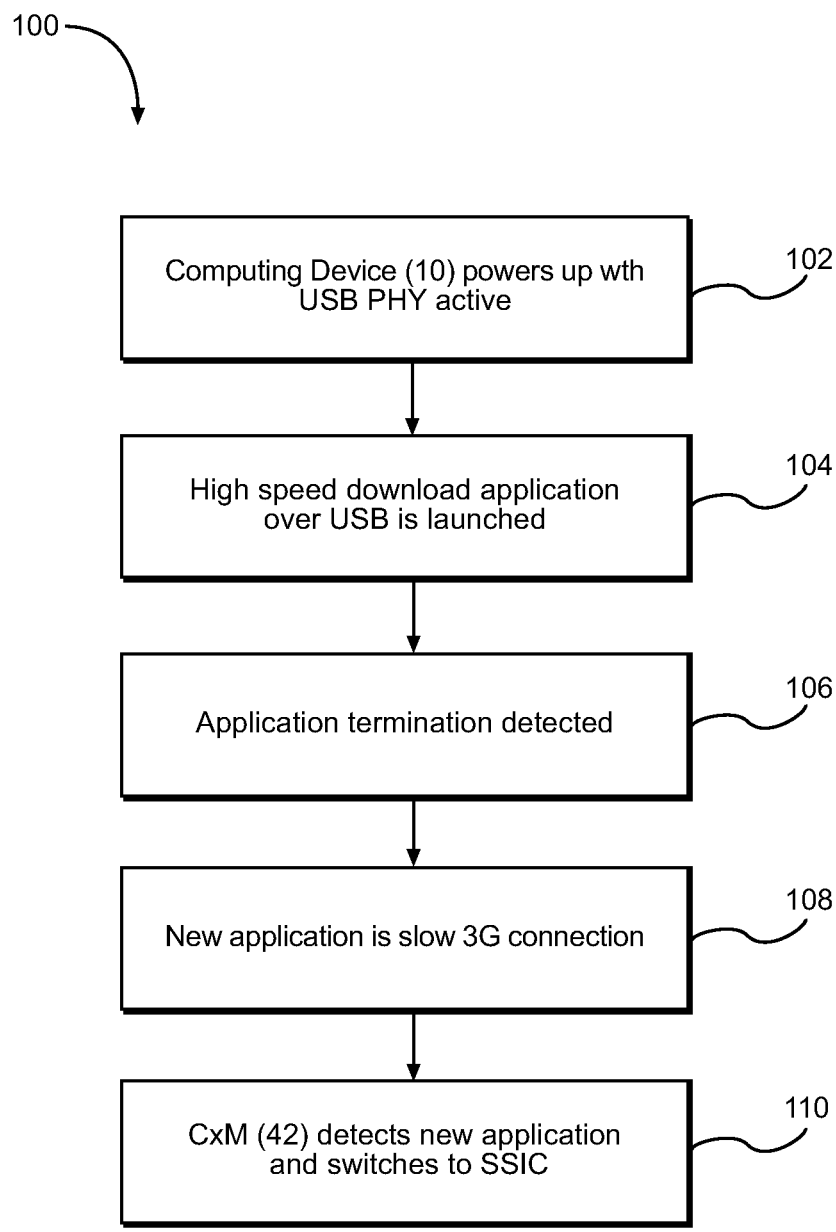
FIG. 6 is a flow chart of a second exemplary process of changing a PHY during operation to conserve power.

FIG. 6 illustrates another exemplary process 100 relating to application requirements. In particular, the process 100 begins with the computing device 10 of FIG. 1 powering up an internal interface with a USB PHY active (block 102). The computing device 10 launches a high speed download application over USB 3.0 to transfer data between the computing device 10 and an external computing device (block 104). The CxM 42 detects this application launch and remains in USB to deal with the EMI caused by the high speed download. The high speed application terminates after the data transfer is completed, and the CxM 42 detects the application termination (block 106). A new application is launched using a relatively slow 3G (third generation) connection (block 108). The CxM 42 detects the new application, compares it to the information in the DB 46, and switches the PHY to SSIC PHY to save power (block 110). As discussed above, the CxM 42 detects the operating conditions and selects an appropriate PHY for optimal performance according to the predefined criteria set forth in the DB 46.

Figure 7:
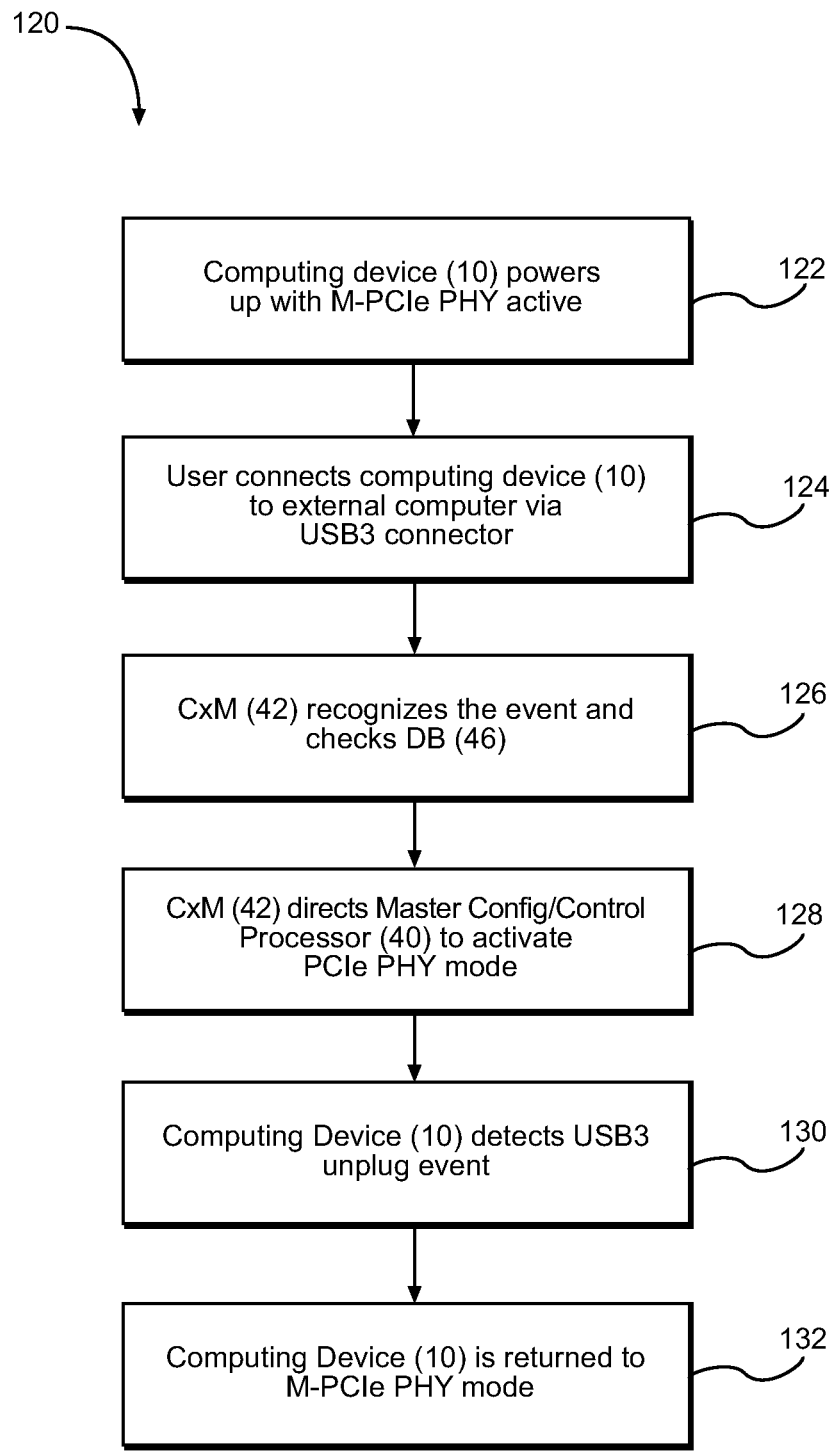
FIG. 7 is a flow chart of a third exemplary process of changing a PHY configuration based on electromagnetic interference (EMI) from a wired aggressor.

FIG. 7 illustrates another exemplary process 120 relating to wired emissions. In particular, the process 120 begins with the computing device 10 of FIG. 1 powering up with the M-PCIe PHY active according to the base programming (block 122). A user connects the computing device 10 to an external computer via a USB 3.0 connector (block 124). The CxM 42 detects the event and, because this circumstance is known to cause intermittent bit errors in the M-PCIe receiver, the DB 46 indicates that a change in PHY is needed (block 126). The CxM 42 directs the master configuration and control processor 40 to activate the PCIe PHY mode (block 128). The computing device 10 is then unplugged from the external computer. The CxM 42 detects this unplug event (block 130) and instructs the master configuration and controller processor 40 to return to the M-PCIe PHY mode (block 132).

Figure 8:
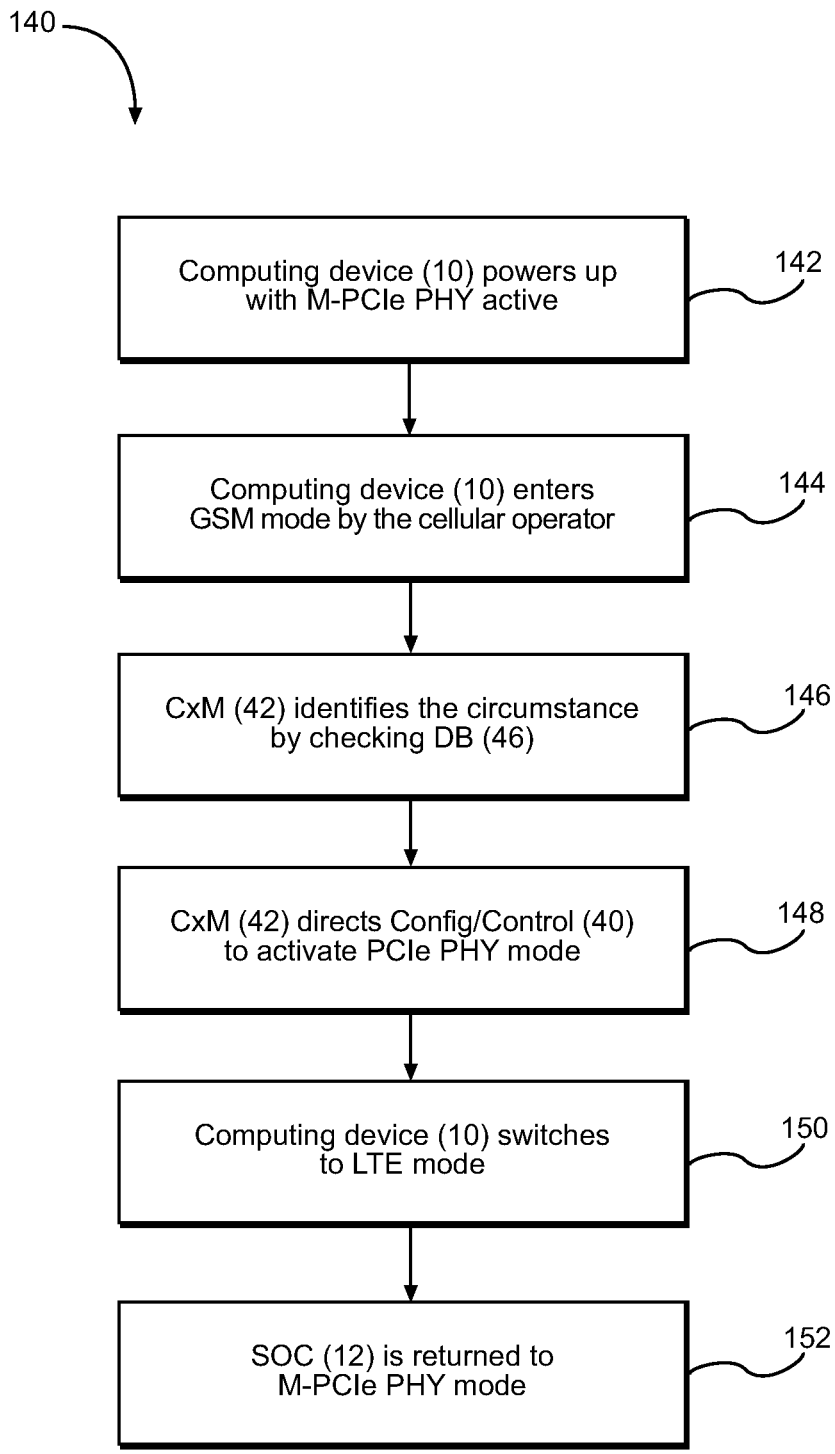
FIG. 8 is a flow chart of a fourth exemplary process of changing a PHY configuration based on EMI from a wireless aggressor.

FIG. 8 illustrates another exemplary process 140 relating to wireless emissions. In particular, the process 140 begins with the computing device 10 of FIG. 1 powering up with the M-PCIe PHY active according to the base programming (block 142). The computing device 10 enters a global system for mobile communications (GSM) mode by a cellular operator (block 144). The CxM 42 detects the event and checks the DB 46 (block 146), and, because this circumstance is known to cause intermittent bit errors in the M-PCIe receiver, the DB 46 indicates that a change in PHY is needed. The CxM 42 directs the master configuration and control processor 40 to activate the PCIe PHY mode (block 148). The computing device 10 switches to a long-term evolution (LTE) cellular mode (block 150), which is detected by the CxM 42. Because LTE does not cause the same errors, the SOC 12 returns to the M-PCIe PHY mode (block 152).

The systems and methods for providing power savings or interference mitigation on physical transmission media according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
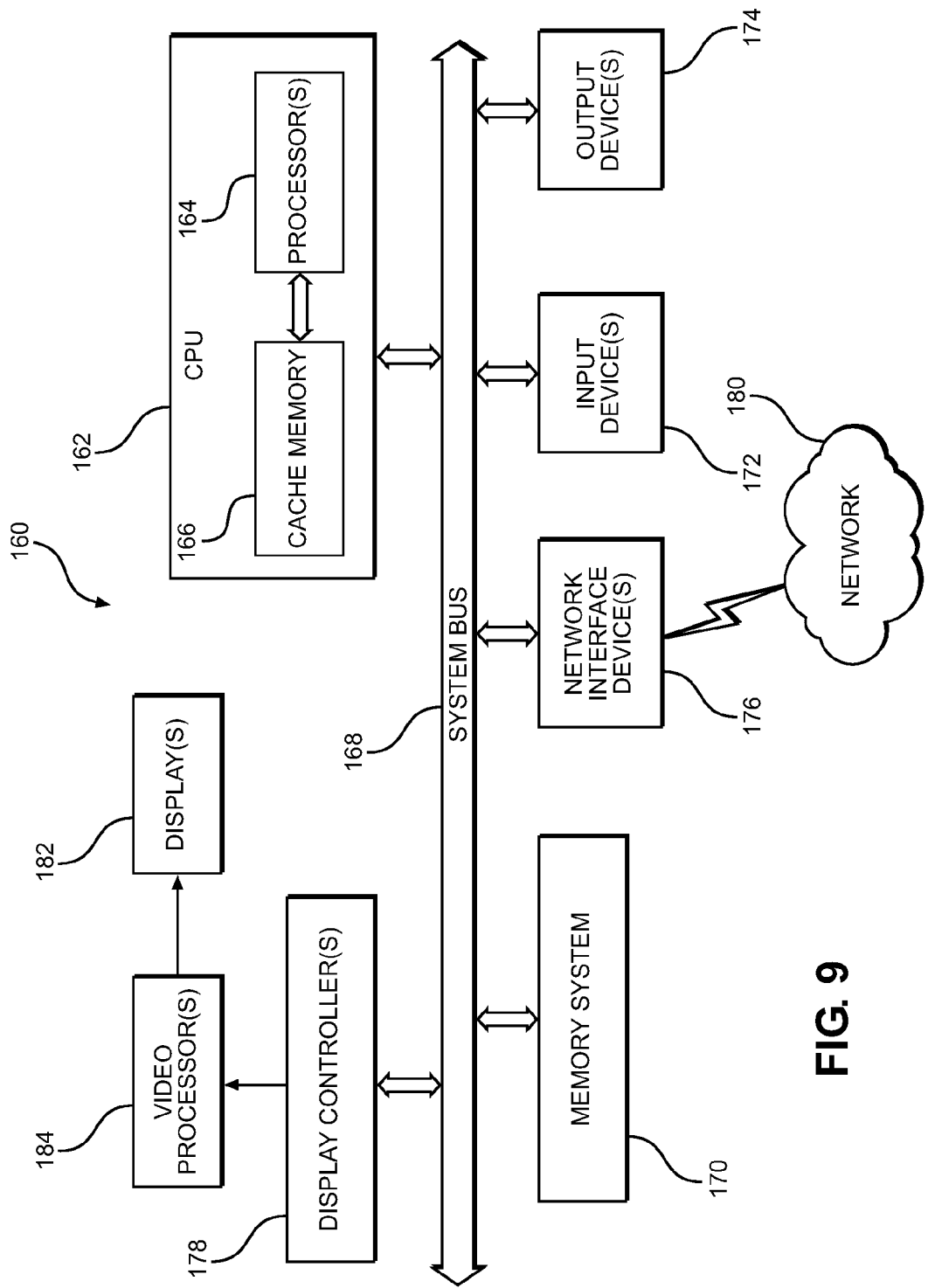
FIG. 9 is a block diagram of an exemplary processor-based system that can include the changing PHY processes described herein.

In this regard, FIG. 9 illustrates an example of a processor-based system 160 that can employ the SOCs 12, 12', 12", or 12''' that have multiple PHY capabilities illustrated in FIGS. 1-3B. In this example, the processor-based system 160 includes one or more CPUs 162, each including one or more processors 164. The CPU(s) 162 may have cache memory 166 coupled to the processor(s) 164 for rapid access to temporarily stored data. The CPU(s) 162 is coupled to a system bus 168 and can intercouple devices included in the processor-based system 160. The system bus 168 may be the transmission media 16 illustrated in FIGS. 1-3. As is well known, the CPU(s) 162 communicates with these other devices by exchanging address, control, and data information over the system bus 168. For example, the CPU(s) 162 can communicate bus transaction requests to a memory system 170.

Other devices (e.g., the SOC 14 of FIGS. 1 and 2) can be connected to the system bus 168 (not shown in FIG. 9). As illustrated in FIG. 9, these devices can include the memory system 170, one or more input devices 172, one or more output devices 174, one or more network interface devices 176, and one or more display controllers 178, as examples. The input device(s) 172 can include any type of input device, including but not limited to input keys, switches, voice processors, etc. The output device(s) 174 can include any type of output device, including but not limited to audio, video, other visual indicators, etc. The network interface device(s) 176 can be any devices configured to allow exchange of data to and from a network 180. The network 180 can be any type of network, including but not limited to, a wired or wireless network, a private or public network, a local area network (LAN), a wide local area network (WLAN), and the Internet. The network interface device(s) 176 can be configured to support any type of communication protocol desired.

The CPU(s) 162 may also be configured to access the display controller(s) 178 over the system bus 168 to control information sent to one or more displays 182. The display controller(s) 178 sends information to the display(s) 182 to be displayed via one or more video processors 184, which process the information to be displayed into a format suitable for the display(s) 182. The display(s) 182 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing device, comprising:
    a system on a chip (SOC) comprising:
        an interface comprising one or more pins coupled to a physical conductor; and
        a configuration controller associated with the interface; and
    a coexistence manager communicatively coupled to the configuration controller;
    wherein the coexistence manager detects operating conditions on the physical conductor and instructs the configuration controller to change physical layer (PHY) configurations for the interface to compensate for changes in the operating conditions by instructing the configuration controller to change between different PHYs within a set of related PHYs by changing between a Peripheral Component Interconnect (PCI) express (PCIe) PHY and a mobile PCIe (M-PCIe) PHY.

2. The computing device of claim 1, further comprising coexistence memory comprising a database with one or more predefined thresholds relating to the operating conditions.

3. The computing device of claim 1, wherein the configuration controller is configured to change the PHY configurations selected from the group consisting of: a voltage setting, a resistor termination setting, and a transmitter slew rate.

4. The computing device of claim 1, wherein the coexistence manager is configured to detect changes in electromagnetic interference (EMI) and adjust the PHY configurations to compensate based on the changes in the EMI.

5. The computing device of claim 1, wherein the coexistence manager is configured to detect a type of computing environment and adjust the PHY configurations based on the type of the computing environment.

6. The computing device of claim 5, wherein the coexistence manager detects the type of the computing environment selected from the group consisting of: a smart phone and a tablet.

7. The computing device of claim 1, further comprising the physical conductor.

8. The computing device of claim 7, further comprising a second SOC coupled to the physical conductor.

9. The computing device of claim 7, wherein the SOC, the physical conductor, and the coexistence manager are all positioned within a single integrated circuit or a multi-die configuration within a single package.

10. A system on a chip (SOC), comprising:
an interface comprising one or more pins coupled to a physical conductor; and
a configuration controller associated with the interface configured to change physical layer (PHY) configurations for the interface in response to a received instruction relating to a change in the PHY configurations to compensate for changes in operating conditions, by changing between different unrelated PHYs by changing between a Peripheral Component Interconnect (PCI) express (PCIe) PHY and a Universal Serial Bus (USB) PHY.

11. The SOC of claim 10, wherein the configuration controller is configured to change the PHY configurations selected from the group consisting of: a voltage setting, a resistor termination setting, and a transmitter slew rate.

12. A method of controlling data transmission in a computing device, the method comprising:
detecting initial operating conditions within a computing device with a coexistence manager;
instructing a configuration controller in a system on a chip (SOC) to operate according to a first physical layer (PHY) configuration;
detecting subsequent operating conditions within the computing device; and
instructing the configuration controller to change the first PHY configuration to a second PHY configuration based on the subsequent operating conditions to compensate for changes in the subsequent operating conditions by instructing the configuration controller to change between different PHYs within a set of related PHYs by instructing the configuration controller to change between a Peripheral Component Interconnect (PCI) express (PCIe) PHY and a mobile PCIe (M-PCIe) PHY.

13. The method of claim 12, wherein detecting the initial operating conditions comprises detecting an initial operating condition selected from the group consisting of: an installation factor and an electromagnetic interference (EMI) value.

14. The method of claim 12, wherein detecting the subsequent operating conditions comprises detecting a subsequent operating condition selected from the group consisting of: an EMI value and power consumption.

15. The method of claim 12, further comprising changing the first PHY configuration to the second PHY configuration based on the instructing.

16. The method of claim 15, wherein changing the first PHY configuration comprises changing a PHY configuration selected from the group consisting of: a voltage swing, resistor termination values, and a transmitter slew rate.

17. A method of controlling data transmission in a computing device, the method comprising:
receiving, at a configuration controller within a system on a chip (SOC), an instruction to operate according to a physical layer (PHY) configuration; and
receiving, at the configuration controller, a subsequent instruction to change the PHY configuration based on subsequent operating conditions and changing the PHY configuration based on the subsequent instruction to compensate for changes in the subsequent operating conditions by changing between different unrelated PHYs by changing between a Peripheral Component Interconnect (PCI) express (PCIe) PHY and a Universal Serial Bus (USB) PHY.

18. The method of claim 17, wherein changing the PHY configuration comprises changing a PHY configuration selected from the group consisting of: a voltage swing, resistor termination values, and a transmitter slew rate.

* * * * *